US009009132B2

(12) United States Patent
Camper

(10) Patent No.: US 9,009,132 B2
(45) Date of Patent: Apr. 14, 2015

(54) LOCATION-AWARE BUSINESS DATA RETRIEVAL

(75) Inventor: Daniel Scott Camper, Cedar Park, TX (US)

(73) Assignee: The Dun & Bradstreet Corporation, Short Hills, NJ (US)

( * ) Notice: Subject to any disclaimer, the term of this patent is extended or adjusted under 35 U.S.C. 154(b) by 142 days.

(21) Appl. No.: 13/041,179

(22) Filed: Mar. 4, 2011

(65) Prior Publication Data

US 2011/0218985 A1  Sep. 8, 2011

Related U.S. Application Data

(60) Provisional application No. 61/310,977, filed on Mar. 5, 2010.

(51) Int. Cl.
*G06F 17/30* (2006.01)
*G06Q 30/02* (2012.01)
*G06Q 30/06* (2012.01)

(52) U.S. Cl.
CPC ...... *G06F 17/3087* (2013.01); *G06F 17/30241* (2013.01); *G06F 17/30864* (2013.01); *G06Q 30/0282* (2013.01); *G06Q 30/06* (2013.01)

(58) Field of Classification Search
CPC ............... H04W 4/025; G06F 17/3087; G06F 17/30241; G06F 17/30864; G06F 17/30867; G06Q 30/0282; G06Q 30/0259; G06Q 30/0205
See application file for complete search history.

(56) References Cited

U.S. PATENT DOCUMENTS

| | | | | |
|---|---|---|---|---|
| 6,701,307 | B2 * | 3/2004 | Himmelstein et al. | 707/743 |
| 7,702,673 | B2 * | 4/2010 | Hull et al. | 707/707 |
| 7,984,068 | B2 * | 7/2011 | Ranjan et al. | 707/784 |
| 8,108,416 | B2 * | 1/2012 | Marlow | 707/763 |
| 8,121,999 | B2 * | 2/2012 | Hansen et al. | 707/706 |
| 2001/0011270 | A1 * | 8/2001 | Himmelstein et al. | 707/3 |
| 2005/0027705 | A1 * | 2/2005 | Sadri et al. | 707/5 |
| 2008/0233927 | A1 * | 9/2008 | Moon et al. | 455/414.1 |
| 2008/0255758 | A1 | 10/2008 | Graham et al. | |
| 2009/0138445 | A1 * | 5/2009 | White et al. | 707/3 |
| 2010/0009662 | A1 * | 1/2010 | Khosravy et al. | 455/414.1 |
| 2010/0114941 | A1 * | 5/2010 | Von Kaenel et al. | 707/769 |
| 2010/0142715 | A1 * | 6/2010 | Goldstein et al. | 381/56 |
| 2010/0293173 | A1 * | 11/2010 | Chapin et al. | 707/759 |
| 2010/0331015 | A1 * | 12/2010 | Cherifi | 455/456.3 |

OTHER PUBLICATIONS

International Search Report and Written Opinion dated Apr. 26, 2011 based on corresponding PCT Application No. PCT/US11/27263.
International Preliminary Report on Patentability dated May 16, 2012 corresponding to International Patent Application No. PCT/US11/27263.

* cited by examiner

*Primary Examiner* — Leslie Wong
(74) *Attorney, Agent, or Firm* — Ohlandt, Greeley, Ruggiero & Perle LLP

(57) ABSTRACT

There is provided a method that includes (a) sending to a geocoding service, an indicator of a location, where the geocoding service returns a bounding box that defines a geographic area, (b) sending to a search engine, a first query that includes the bounding box and a first parameter, where the search engine returns an identifier of a first business entity located within the geographic area and an indicator of an industry in which the first business entity is engaged, and (c) sending to the search engine, a second query that includes the bounding box and the indicator of the industry in which the first business entity is engaged, where the search engine returns coordinates of a second business entity located within the geographic area.

21 Claims, 22 Drawing Sheets

EMPLOYEES NAV

KEYWORD NAV

FILTER SETS

PLACE CALL

PLACE CALL

PROFILE 2

DRIVING DIRECTIONS

WEB SITE

LOCATION-AWARE BUSINESS DATA RETRIEVAL

COPYRIGHT NOTICE

A portion of the disclosure of this patent document contains material which is subject to copyright protection. The copyright owner has no objection to the reproduction by anyone of the patent document or the patent disclosure, but otherwise reserves all copyright rights whatsoever.

BACKGROUND

1. Field of the Invention

The present disclosure relates to location-aware data services. Particularly, the present disclosure relates to location-aware data services for locating prospective business customers according to a geographic-centric context.

2. Description of the Related Art

Conventional business information data is typically gathered by static regional searching of databases based upon inputted locations. Thus, a sales person would enter search queries into a search dialog box requesting information on business entities in a certain location.

The problem with such conventional searching is that it does not provide any real time results which would allow a sales person to obtain prospective business customers based upon the sales person's current location to assist in prospective mining of such new business opportunities.

The present disclosure overcomes the deficiencies of such conventional static searching and allows for providing location-aware searching for prospective business customers based upon the current location of a user.

SUMMARY

There is provided a method that includes (a) sending to a geocoding service, an indicator of a location, where the geocoding service returns a bounding box that defines a geographic area, (b) sending to a search engine, a first query that includes the bounding box and a first parameter, where the search engine returns an identifier of a first business entity located within the geographic area and an indicator of an industry in which the first business entity is engaged, and (c) sending to the search engine, a second query that includes the bounding box and the indicator of the industry in which the first business entity is engaged, where the search engine returns coordinates of a second business entity located within the geographic area.

There is also provided a method that includes (a) sending to a geocoding service, a search string that includes an indicator of a location and other information, wherein the geocoding service returns (i) a bounding box that defines a geographic area, and (ii) a set of terms that the geocoding service utilized to produce the bounding box, (b) identifying a term from the search string that is not in the set of terms, and (c) sending to a search engine, a query that includes the term and the bounding box, wherein the search engine returns coordinates of a set of business entities located within the geographic area.

DESCRIPTION OF THE PREFERRED EMBODIMENT

Figure 1:
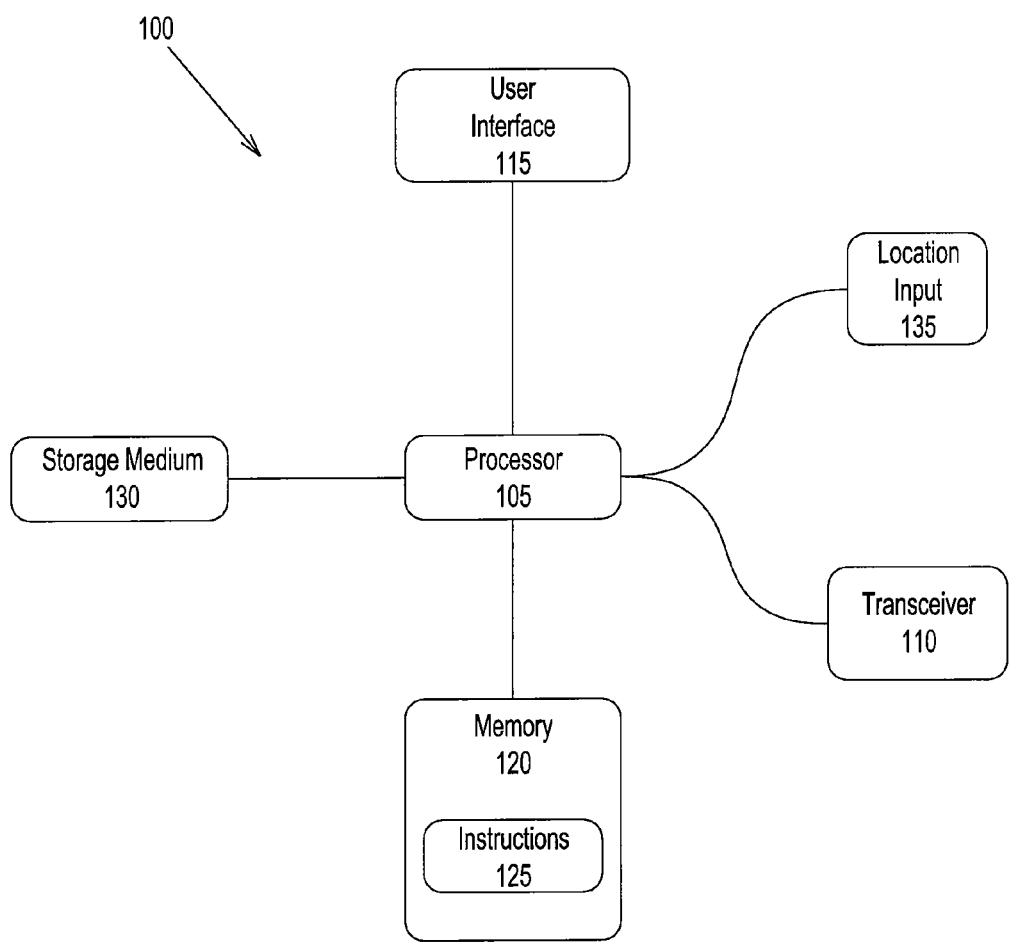
FIG. 1 is a block diagram of a location-aware data service client.

FIG. 1 is a block diagram of a location-aware data service client, i.e., client 100. Client 100 provides a central processor 105 that is in communication with a plurality of modules. As used herein, the term "module" may denote a functional unit that is implemented in one or more of software, firmware, hardware, and equivalents thereof.

One such module is a transceiver 110. Transceiver 110 is an interface to a communication network (not shown), for example, a mobile telephony network, a TCP/IP network, a circuit-switched network, or the like.

A further such module is a user interface 115. User interface 115 provides an input (not shown) that is a man-machine interface (MMI) with controls for a user to command client 100. User interface 115 further provides an output (not shown) for communicating prompts, alerts, menus, dialogs, and other signals that are perceptible to the user.

Client 100 further provides a memory 120 that is in communication with processor 105. Instructions 125 are resident in memory 120 and are readable by processor 105, and when read by processor 105 cause processor 105 to carry out the steps of methods described herein. Instructions 125 may also be stored on a storage medium 130 for loading into memory 120. Storage medium 130 in turn may be physically distant to processor 105, local to processor 105, or some combination of local and distant. Each of memory 120 and storage medium 130 is a non-transitory storage medium.

Processor 105 is also in communication with a location input 135 for supplying a geographic location datum. In an embodiment, location input 135 is a Global Positioning System (GPS) receiver. However, it is within the contemplation of the present disclosure that location input 135 may be a geographic location source that is extrinsic to client 100, such as cell network triangulation or a geocoding service. Also within the contemplation of the present disclosure is that location input 135 can be a user input that is not related to a physical location of client 100. For example, the user (and thus client 100) may be in New York, but the user is free to enter "123 Main St., Austin, Tex." as location input 135.

Geocoding, as used herein, means a process of converting an indicator of a location into a geographic area. The indicator of the location may be in the form of an address, e.g., 123 Main Street, Anytown, Tex., a name of a town or a city, or a landmark at a known location, e.g., Dallas-Fort Worth Airport (DFW). The geographic area is bounded by a perimeter, e.g., an area in the form of a rectangle or a circle, having a central point of reference at a particular latitude and longitude. In a case where the bounded perimeter is an area in the form of a rectangle or a circle, the central point of reference may be a geometric center of the bounded perimeter.

Accuracy is scored according to a size of a so-called bounding box, which is four latitude/longitude pairs that describe a polygon bounding the physical location. For example, an accuracy code of 1 may represent a building, and an accuracy code of 9 may represent the world. Low accuracy, i.e., a high accuracy code, means that a large area is being represented, and that therefore, the area being represented is not zoomed in too close. For example, if the physical location is derived by GPS, then the physical location will be a latitude/longitude, e.g., 32-40-45.020N 116-57-58.250W, and an estimated accuracy, e.g., 7 out of a possible 9.

Figure 2:
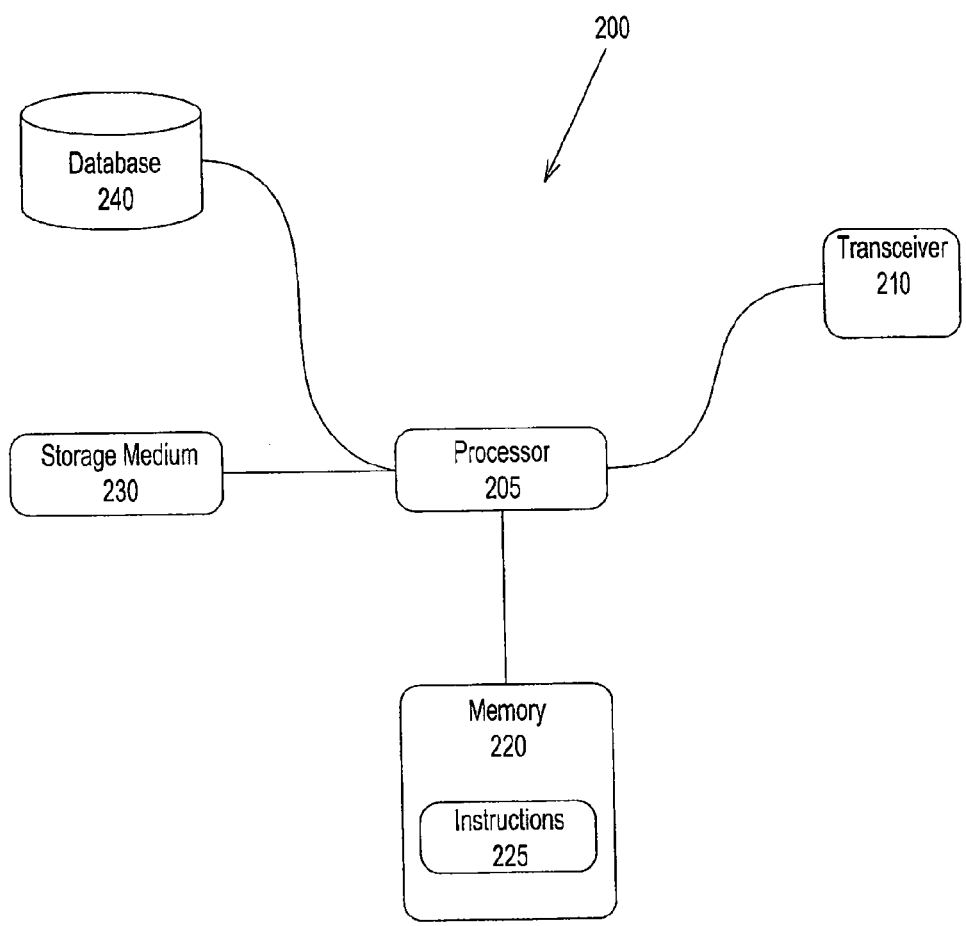
FIG. 2 is a block diagram of a business search engine.

FIG. 2 is a block diagram of a business search engine, i.e., business search engine 200. Business search engine 200 includes a central processor 205 that is in communication with a plurality of modules.

One such module is a transceiver 210. Transceiver 210 is an interface to a communication network (not shown), for example, a mobile telephony network, a TCP/IP network, a circuit-switched network or the like. Via transceiver 210, business search engine 200 is in communication with one or more clients 100 over the communication network.

Business search engine 200 further provides a memory 220 that is in communication with processor 205. Instructions 225 are resident in memory 220 and are readable by processor 205, and when read by processor 205 cause processor 205 to carry out the steps of methods described herein. Instructions 225 may also be stored on a storage medium 230 for loading into memory 220. Storage medium 230 in turn may be physically distant to processor 205, local to processor 205, or some combination of local and distant. Each of memory 220 and storage medium 230 is a non-transitory storage medium.

Processor 205 is further in communication with a database 240 for storing information about business entities. The information for a particular business entity includes the business entity's official name, common name, doing business as (DBA) name(s), industry, size information, contact information, and an identifier that uniquely identifies the business entity. A Data Universal Numbering System (DUNS) number is an example of such an identifier. The DUNS number is a unique numeric identifier assigned to a single business entity. Any other relevant information may also be included. The information also contains a latitude/longitude coordinate that indicates the entity's location. Database 240 is a data structure or hardware device, including without limitation magnetic storage, optical storage, magneto-optical storage, flash, RAM, ROM, or the like.

Business search engine 200, when presented with a query, performs a search of database 240, and if the search is successful, returns information from database 240 about one or more business entities. The query should include a geographic area and one or more words that business search engine 200 can utilize for a key word search. Business search engine 200 returns information about business entities within the geographic area. The information that is returned is organized as records, and more particularly, one record for each business entity. The record for a particular business entity includes a latitude/longitude coordinate that indicates the business entity's location and other information such as the business entity's official name, common name, doing business as (DBA) name(s), industry, size information, contact information, etc. An exemplary implementation of business search engine 200 is a Hoover's™ search engine. Hoover's is a trademark of Hoover's Inc.

Figure 3:
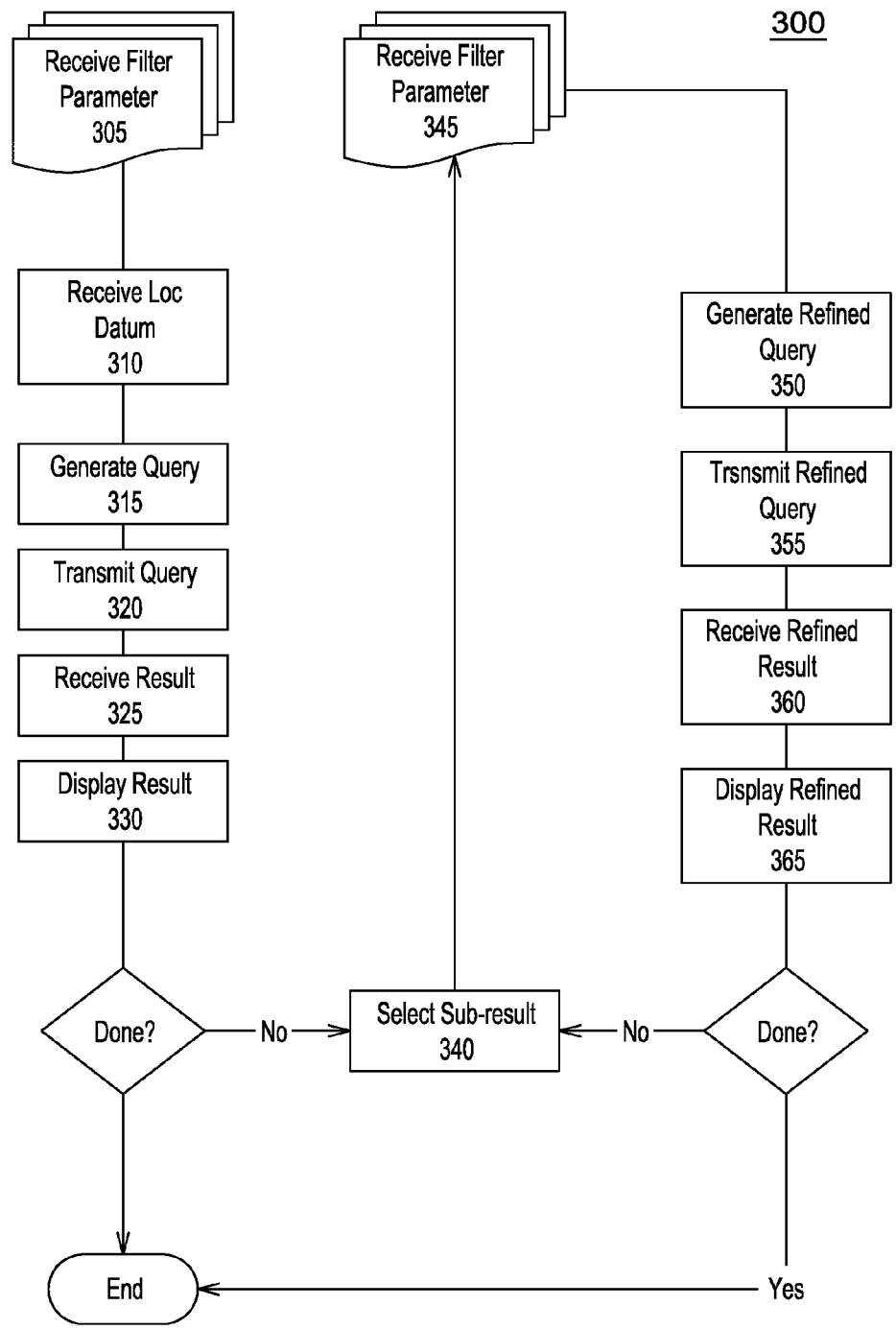
FIG. 3 is a flowchart of a method of location-aware searching for a business entity.

FIG. 3 is a flowchart of a method 300 of location-aware searching for a business customer. Method 300 is performed by processor 105 and begins at step 305.

In step 305, processor 105 receives filter parameters. The filter parameters may be newly entered by the user via user interface 115, or retrieved from memory 120. In practice, the filter parameters should be relevant to the user's desired potential customer. For example, the parameters may include annual sales; number of employees at a business location; primary industry; and keywords to search. Sales and employee filters are represented as a set of ranges ("buckets"). The user may enter multiple parameters for sales, employees, and industry. The industry filter allows the user to search for industry names to locate industries of interest more readily. The user's filter parameters are one component of a search query to be generated for finding a business customer. The user may use multiple filters. Keyword searching also permits a use of multiple words.

Also, within a filter, the user may select ranges that are not contiguous. For example, a filter for annual sales may have several ranges, such as 1-5 million dollars, 5-20 million dollars, and 20-50 million dollars, and the user may select ranges of 1-5 million dollars and 20-50 million dollars. A search would thus be conducted for businesses having annual sales of 1-5 million dollars or 20-50 million dollars.

The user can store various sets of filters to accomplish desired searches quickly. Thus, if the user is a paper pulp salesman, then he might, for example, maintain filter sets to capture companies that frequently purchase timber. Client 100 provides a convenient interface (shown in FIG. 13) for the user to access his filter sets.

From step 305, method 300 progresses to step 310.

In step 310, processor 105 receives another component of the search query to be generated, namely a geographic area. The geographic area pertains either to a physical location of client 100, or to another location desired by the user. The physical location of client 100 is derived from location input 135. If the user wishes to specify a location, the user can either provide an indicator of a location, e.g., and address or a landmark, via user interface 115, or retrieve the indicator of the location from memory 120, and thereafter processor 105 sends the indicator of the location to a geocoding service. The geocoding service may be on a third party server (not shown) that processor 105 accesses via a communication network (not shown), or that processor 105 accesses via business search engine 200. Alternatively, the geocoding service may be a modular component embedded in instructions 225, or a process executed on a device (not shown) that is external to business search engine 200 but invoked by processor 205. The geocoding service returns a geographic area defined by a bounding box and a central point of reference. The geocoding service also returns an accuracy code. From step 310, method 300 progresses to step 315.

In step 315, processor 105 assembles the filter parameters and the geographic area, i.e., the bounding box, into a query. From step 315, method 300 progresses to step 320.

In step 320, processor 105 sends the query to business search engine 200 via transceiver 110. Business search engine 200 receives the query via transceiver 210, and performs an initial search for a business record in database 240 that satisfies the query. That is, information about one or more business entities that are located in the geographic region. Business search engine 200 returns an initial search result. From step 320, method 300 progresses to step 325.

In step 325, processor 105 receives the initial search result. From step 325, method 300 progresses to step 330.

In step 330, processor 105 presents the initial search result to the user on user interface 115 to show, information such as an official company name, DBA name(s), DUNS number, physical address, primary telephone number, website URL, primary industry, last-known annual sales figure, last-known number of employees at that location, and list of key contacts (people) associated with the company.

A business record from the initial search result can be displayed as a pin on a map, denoting a geographical location on the map, or in a list view. Business search engine 200 by default retrieves business records in a particular sort order that creates a "top companies" search (the order is "sort by annual sales, descending"). The user may change this sort order in the list view. Available sort options are annual sales, number of employees at that location, and company name, and all three sort fields may be set as ascending or descending sorts. Changes to the sort order forces a new search, with corresponding changes to the contents of the list view and map view.

At step 330, if the user requires no further information, method 300 ends. However, the user may elect to perform a refined search on a sub-result of the initial search. For example, the initial search has returned to the user a record for a paper pulp company, and the user may be desirous of finding a local competitor of the pulp company. To accommodate such a refined search, method 300 proceeds to step 340.

In step 340, processor 105 receives input from the user via user interface 115, where the user selects the previously-returned business record as a sub-result. From step 340, method 300 progresses to step 345.

In step 345, processor 105 receives an additional (or uses a stored) filter parameter. By way of example, the additional filter parameter is a value that will match a record for a business that is both within a particular distance from, and in the same industry as, a business returned in the initial search. From step 345, method 300 progresses to step 350.

In step 350, processor 105 uses the sub-result and the additional filter parameter together, to generate a refined query. From step 350, method 300 progresses to step 355.

In step 355, the refined query is transmitted to business search engine 200 and searched as in step 320. From step 355, method 300 progresses to step 360.

In step 360, processor 105 receives a refined query result. From step 360, method 300 progresses to step 365.

In step 365, processor 105 displays the refined query result on user interface 115. If the user elects to refine further, for example, by selecting a different distance, then method 300 returns to step 340. Otherwise, method 300 will end.

As noted above, method 300 can be applied to perform a search for competitors, i.e., a competitor search. A competitor search is a specific search using two query parameters (1) the industry of a primary company, i.e., the company for which the user is trying to find competitors, and (2) a geographic area. The geographic area is an area centered around the primary company's physical location, the size of which is determined by the user as a preference setting. A typical preference setting is "10 miles." The result of the competitor search, is other companies near the company that operate in the same industry as the primary company, that is, a group commonly referred to as competitors.

For example, assume that in step 325, "Company ABC", has been located, and in step 330, information about Company ABC is presented on user interface 115. The user selects Company ABC and chooses to view that company's detailed information. For the competitor search, processor 105 determines both the industry that would be searched as well as the center of the geographic area for the search (defined as Company ABC's physical location). In accordance with the competitor search, processor 105 locates "local competitors", e.g., companies working in the same industry as Company ABC and within a certain distance from Company ABC, and displays the companies on a map or in a list. The distance is user-settable but defaults to some predetermined value, e.g., 10 miles. The competitor search is initiated in step 340 when the user selects "Search for Local Competitors" on user interface 115 (for example, see FIG. 15). While an initial search radius used by the competitor search is relatively static (i.e., only changed as a preference, not on-the-fly), the industry is dynamic. That is, the industry is based on Company ABC's primary industry, rather than on a set list of industries.

Thus, client 100 is an apparatus that includes:
processor 105; and
memory 120, which contains instructions that are readable by processor 105 and cause processor 105 to:
  send to a geocoding service, an indicator of a location, wherein the geocoding service returns (i) a bounding box that defines a geographic area, and (ii) a set of terms that the geocoding service utilized to produce the bounding box;
  send to business search engine 200, a first query that includes the bounding box and a first parameter, wherein business search engine 200 returns an identifier of a first business entity located within the geographic area and an indicator of an industry in which the first business entity is engaged; and
  send to business search engine 200, a second query that includes the bounding box and the indicator of the industry in which the first business entity is engaged, wherein business search engine 200 returns coordinates of a second business entity, e.g., a competitor, located within the geographic area.

The instructions also cause processor 105 to display a map on user interface 115 that indicates a location of the second business entity, based on the coordinates. Each of memory 120 and storage medium 130 is a non-transitory storage medium for storing the instructions.

Figure 3A:
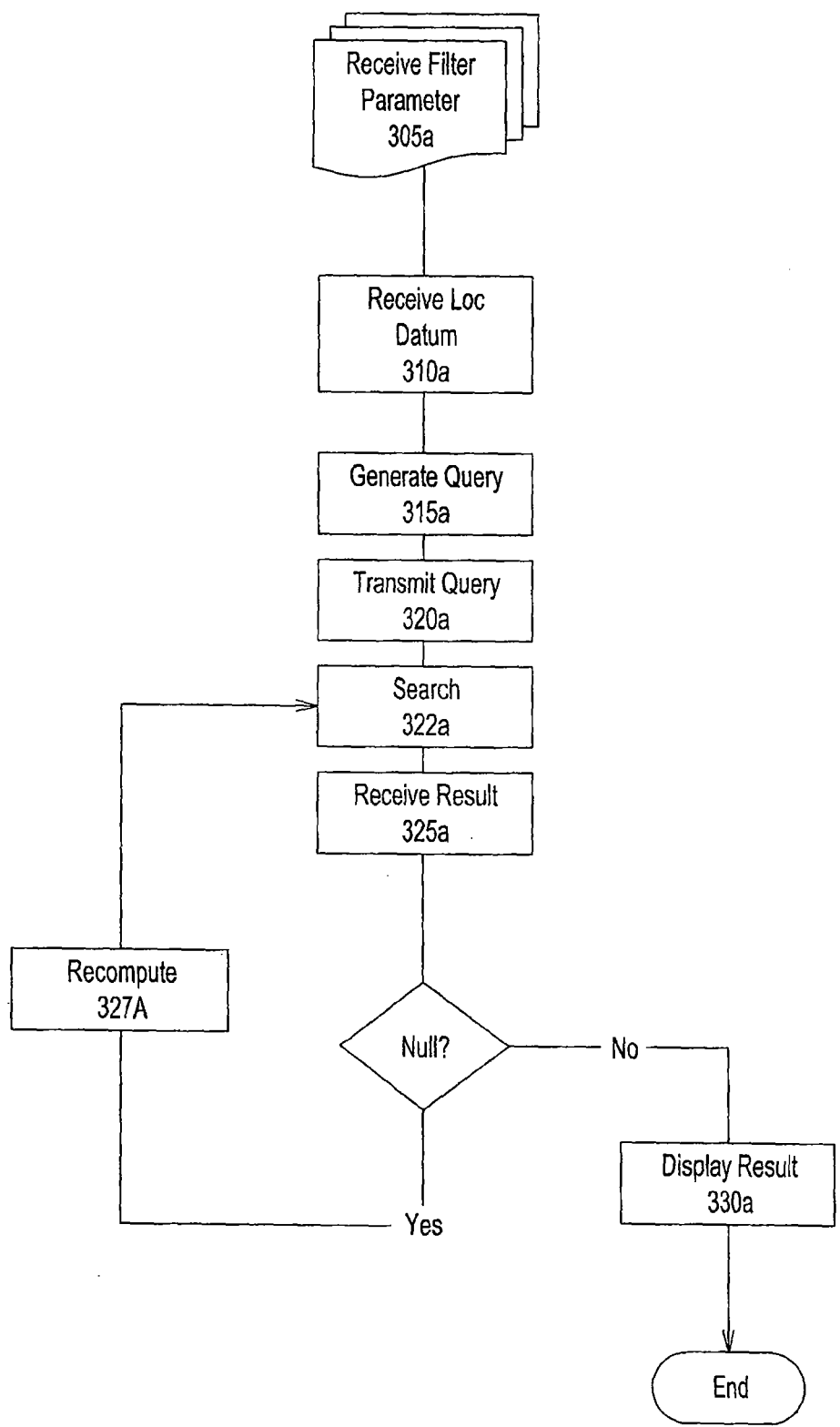
FIG. 3a is a flowchart of a method of expanding a location-aware search for a business entity.

FIG. 3a is a method 300a of location-aware searching for a business customer. Method 300a is performed by processor 105 and begins at step 305a In step 305a, processor 105 receives filter parameters. The filter parameters may be newly entered by the user via user interface 115, or retrieved from memory 120. The user, for example, supplies a filter parameter intended to return a record for a business in the mining industry, having more than one hundred employees. From step 305a, method 300a progresses to step 310a.

In step 310a, processor 105 receives a location datum, for example, a GPS coordinate from location input 135. From step 310a, method 300a progresses to step 315a.

In step 315a, processor 105 generates a query from the filter parameter and the location datum. From step 315a, method 300a progresses to step 320a.

In step 320a, processor 105 transmits the query to business search engine 200. Business search engine 200 uses the location datum to derive a first bounding box. From step 320a, method 300 progresses to step 322a.

In step 322a, processor 105 waits while business search engine 200 searches database 240 using the query. Business search engine 200 returns only records having a location (e.g., a latitude/longitude) that is within the supplied bounding box. From step 322a, method 300 progresses to step 325a.

In step 325a, processor 105 receives results of the search. If the results are null, i.e., if there is not a matching record within the first bounding box, then method 300a proceeds to step 327a. If the results are not null, then method 300a proceeds to step 330a.

In step 327a, processor 105 re-computes a new bounding box that encompasses a larger geographic area than the previous bounding box, and sends the new bounding box in a query to business search engine 200. From step 327a, method 300 loops back to step 322a.

In step 330a, processor 105 displays the results on user interface 115. Method 300a then ends.

Figure 4:
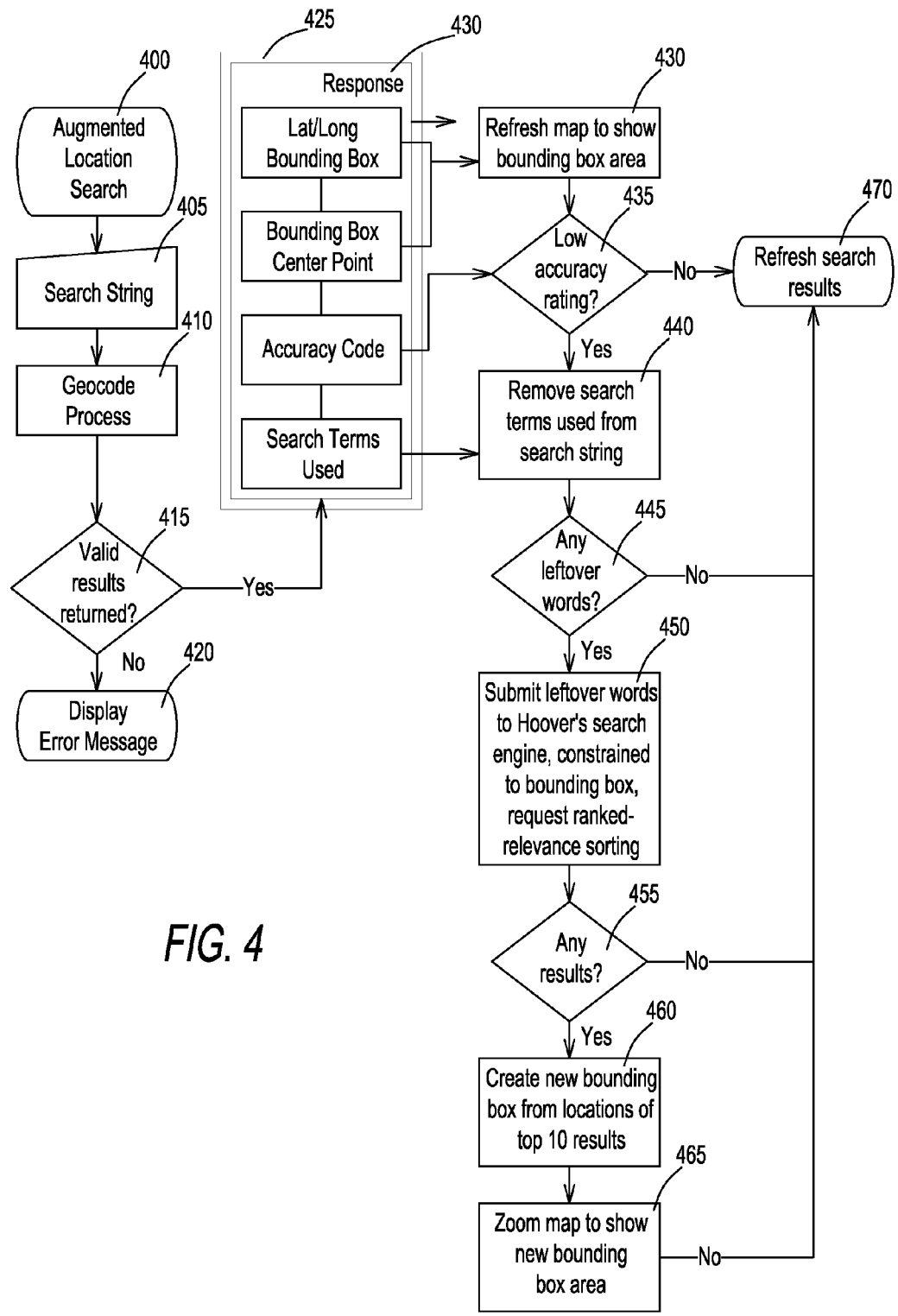
FIG. 4 is a flowchart of augmented location search method.

FIG. 4 is a flowchart of an augmented location search method ("ALSM") 400. ALSM 400 is performed by client 100 operating in cooperation with business search engine 200, and more specifically processor 105 operating in cooperation with processor 205. ALSM 400 commences with step 405.

In step 405, processor 105 receives a search string from a user of client 100. The search string includes an indicator of a location, for example, an address, a name of a town or a city, or a landmark, e.g., "DFW". The search string may also include other information, for example, a name of a company or an industry. From step 405, ALSM 400 progresses to step 410.

In step 410, processor 105 sends the search string to a geocoding service that converts the indicator of the location into a geographic area. As mentioned above, the geocoding service may be on a third party server (not shown) that processor 105 accesses via a communication network (not shown), or that processor 105 accesses via business search engine 200. Alternatively, the geocoding service may be a modular component embedded in instructions 225, or a process executed on a device (not shown) that is external to business search engine 200 but invoked by processor 205. The geocoding service returns a response. From step 410, ALSM 400 progresses to step 415.

In step 415, processor 105 considers whether the response is valid. In this regard, the geocoding service provides a status code that indicates whether the geocoding service produced a valid result. If the status code indicates that the response is valid, ALSM 400 progresses to step 425. If the status code indicates that response is invalid, ALSM 400 progresses to step 420.

In step 420, processor 105 displays an error message on a display of user interface 115.

In step 425, processor 105 receives the valid response, i.e., response 427. Response 427 has several useful data therein: a latitude/longitude bounding box; a bounding box center point; an accuracy code; and a list of search terms that the geocoding service used to find the geographic area. From step 425, ALSM 400 progresses to step 430.

In step 430, processor 105 prepares a map and displays the map on user interface 115. The latitude/longitude bounding box and the bounding box center coordinate are used by a mapping component (not shown) within client 100 to compute a displayable map. The mapping component may be embodied as a module within instructions 125, or may be a function that is provided as part of an operating system of client 100. In terms of operation, ALSM 400 passes to the mapping function the geographic area defined by the latitude/longitude bounding box, and the mapping function prepares a map. The bounding box center point is at the location that was provided in the search string in step 405. If, at the commencement of step 430, user interface 115 is already displaying a map, processor 105 refreshes the map. From step 430, ALSM 400 progresses to step 435.

In step 435, processor 105 checks the accuracy code to determine whether the area that is bounded by the bounding box is of a desirable size. For example, if the area is too large, e.g., encompasses all of the state of New York, then a resultant map might cover more territory than a user might desire to have covered, and thus the map would identify businesses that are locations at distances greater than the user would wish to travel. If the accuracy code indicates that accuracy is not low, i.e., the accuracy is not generally imprecise and the region within the bounding box is not too large, then the region is deemed to be satisfactory, and ALSM 400 progresses to step 470. If the accuracy code indicates that accuracy is low, i.e., the accuracy is generally imprecise and the region within the bounding box is too large, then ALSM 400 will attempt to reduce the size of the region, and in this regard, ALSM 400 progresses to step 440.

In step 440, processor 105 removes from the search string the search terms that were used by the geocoding service.

To understand the significance of this step, briefly reconsider the operation of ALSM through step 440. In step 405, processor 105 accepts user input, i.e., the search string, which presumably includes an indicator of a location. In step 410, processor 105 sends the entire search string to the geocoding service. The response from the geocoding service, i.e., response 427, provides some geographic boundaries describing a geographic area in the form of latitude/longitude coordinates that define a rectangular area, and also indicates terms within the search string that were actually used to find that geographic area. In step 440, processor 105 compares the terms that were actually used by the geocoding service against the entire search string and finds terms that were not used by the geocoding service. If the geocoding service did not use all of the terms in the search string, then ALSM 400 considers that the unused words might be usable to search for additional information of interest to the user. Thus, ALSM 400 is leveraging the functionality of the geocoding service to examine the search string and identify words that are used by the geocoding service so that ALSM 400 can thereafter easily identify words that are not specifically used to find the geographic area. The terms that were not used by the geocoding service are designated herein as "leftover words". The phrase "leftover words" is used because processor 105 cannot be sure that terms that were not used are meaningful for purposes of designating locations of businesses on the map. The terms that were not used could be meaningful, for example, a company name, or an industry name, or could be of no value, for example, the name of the user's cat. Processor 105 assumes that the leftover words are meaningful, but there is really no guarantee that they are meaningful.

From step 440, ALSM 400 progresses to step 445.

In step 445, processor 105 considers whether there are any leftover words. If there are leftover words, ALSM 400 progresses to step 450. If there are no leftover words, ALSM 400 progresses to step 470.

In step 450 processor 105 constructs an augmentation query and sends the augmentation query to business search engine 200, i.e., business search engine 200. Since there are leftover words, the assumption at this point is that in the search string, the user was including, with the indicator of the location, the name of a company or an industry, or some other business-related information. The augmentation query includes the leftover words and the geographic area defined by the geocoding service.

Business search engine 200 returns only a limited number of records, e.g., the "top" businesses, in order to avoid overwhelming the user. "Top" is usually defined as "largest in terms of revenue" but that can be changed by the user.

Business search engine 200 returns results of the augmentation query, if any, in descending order of relevance. As used herein, relevance is a metric of the rarity of the leftover words in the search corpus, the frequency of the leftover words in individual records of the results, and the density of the leftover words as compared to a result record size. Result records are individually scored, with higher scores denoting increasing relevance. As used herein, the term "search corpus" means the universe of data against which a search may be performed.

From step 450, ALSM 400 progresses to step 455.

In step 455, processor 105 considers whether business search engine 200 returned any results. If business search engine 200 returned no results, then ALSM 400 progresses to step 470. If business search engine 200 returned results, e.g., business records, then ALSM 400 progresses to step 460.

In step 460, processor 105 considers the results from business search engine 200, and as explained below, creates a new bounding box in order to resize the map. Processor 105 creates a new bounding box that encompasses the top 10 results. More specifically, processor 105 extracts latitudes/longitudes of a most relevant subset of the results, e.g., the "top 10", and from these extracted latitudes/longitudes computes an augmented bounding box. As noted above, results from business search engine 200 include information about business entities within the bounding box. However, at this point, ALSM 400 is only interested in the latitude/longitude coordinates of the business entities. This is because, in step 460, ALSM 400 is concerned with resizing the map, and not yet concerned with the other characteristics of the business entities. The augmented bounding box is computed to be a polygonal region of a minimum size needed to circumscribe the extracted latitudes/longitudes. However, the augmented bounding box, indeed any bounding box, need not be polygonal. Any shape of a bounding box is possible, such as a circle. A rectangle is preferred from a computational/resource standpoint, because a rectangle can be defined by two or four points, whereas a circle requires a more complex definition (e.g., a center point and a radius, or a near-infinite number of points on a circular circumference).

ALSM 400 assumes that if the user included non-address words in the query then the user must be interested in businesses associated with those words. If those words actually map to found businesses within the original search region, as a courtesy to the user ALSM 400 attempts to zero in on the user's assumed interest. Thus, the augmented bounding box, by definition, is not larger than the original bounding box returned from the geocoding service. "Top 10" is the "most relevant" in accordance with the definition of "relevance" above. The number 10 was chosen in order to zero-in on only a few of the found business entities, but any desired number can be used.

From step 460, ALSM 400 progresses to step 465.

In step 465, processor 105 zooms or re-centers a map to show the augmented bounding box. From step 465, ALSM 400 progresses to step 470.

In step 470, processor 105 invokes business search engine 200 to search for business entities within the confines of the bounding box. Note that (a) when step 470 is entered from any of steps 435, 445 or 455, the bounding box is the latitude/longitude bounding box as indicated in response 427, and (b) when step 470 is entered from step 465, the bounding box is the latitude/longitude bounding box as calculated in step 460. Nevertheless, processor 105 prepares a query that includes the bounding box, filter parameters (if any) and sorting criteria. There is always at least some sorting criteria, even if only by default, in that the results must either be in some ascending order or some descending order. Processor 105 sends the query to business search engine 200.

Business search engine 200 searches for business entities that are located within the bounding box and that also satisfy the filter parameters (if any). Processor 105 receives results from business search engine 200 and refreshes the display to include the results. For example, processor 105 refreshes the map to present indicators, e.g., pins, at the locations of the business entities. The map thus displays a map with indicators of the locations of businesses in the vicinity of the location indicator that was presented in the search string (in step 405), and that satisfy the a set of filter parameters (if any), and that also consider any other words that the user included in the search string.

Here, ALSM 400 is interested in not only the location of a business entity, but also the business entity's unique identifier, i.e., DUNS number, business name, and telephone number. All of this information, as well as other information about the business entity can be stored on client 100 in memory 120. The unique identifier can be employed to obtain other information about the business entity via business search engine 200, or through utilization of another search engine (not shown). The user can also readily contact the business, as identified by the business name, by calling the telephone number.

To refresh a map can also mean to re-center the map for display on the bounding box center point, at a scale determined by the latitude/longitude bounding box. A refreshing of the display is also triggerable by any of: a change of a visible map region by the user (e.g., the user zooms or rescales a map displayed on user interface 115); when the user makes a change to a filter parameter; when the user makes a change to a sort order of a search result; or when client 100 is started up.

Note that ALSM 400 performs at least a multi-phase search. The first search is performed through use of the geocoding service in step 410. Additional searches are performed through use of business search engine 200 in either or both of steps 450 and 470.

Thus, client 100 is an apparatus that includes:
a processor, i.e., processor 105; and
a memory, i.e., memory 120, that contains instructions that are readable by processor 105 and cause processor 105 to:
send to a geocoding service, a search string that includes an indicator of a location and other information, wherein the geocoding service returns (i) a bounding box that defines a geographic area, and (ii) a set of terms that the geocoding service utilized to produce the bounding box;
identify a term from the search string that is not in the set of terms; and
send to a business search engine 200, a query that includes the term and the bounding box, wherein the business search engine 200 returns coordinates of a set of business entities located within the geographic area.

Each of memory 120 and storage medium 130 is a non-transitory storage medium for storing the instructions.

FIGS. 5-21 show user interface 115 as client 100 performs its methods described herein.

Figure 5:
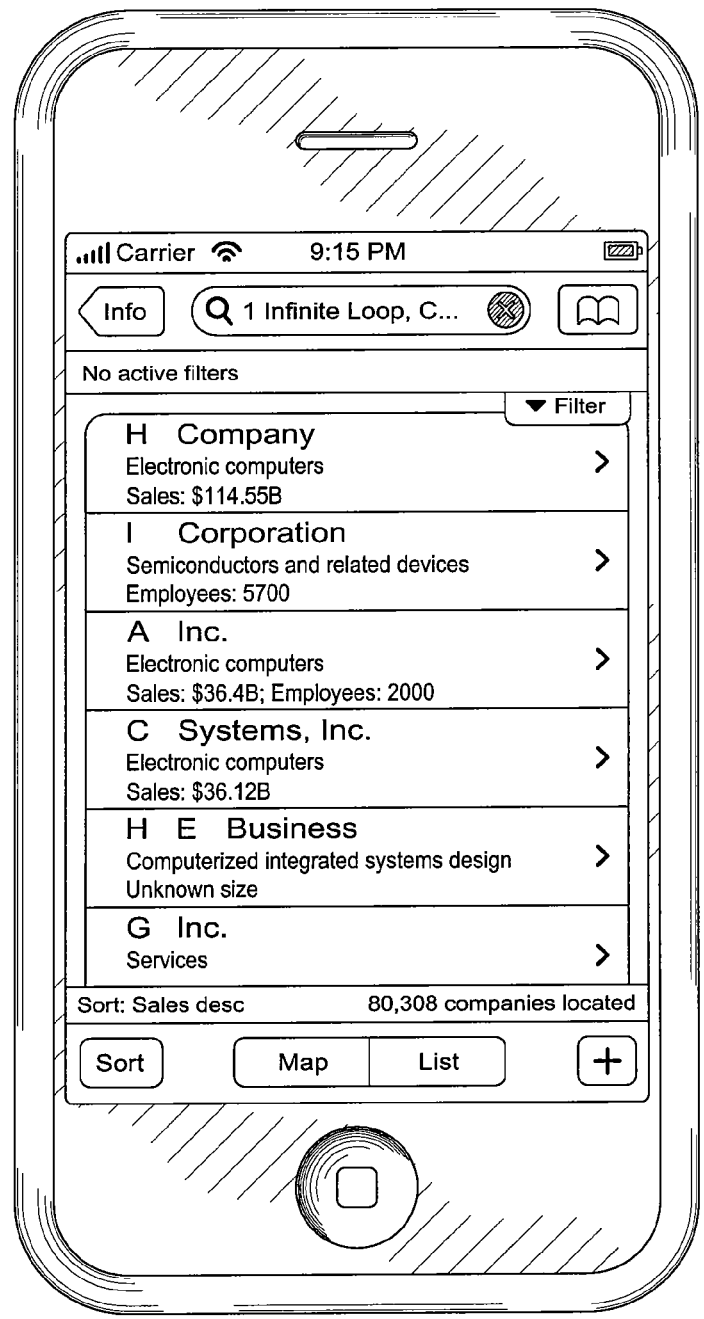
FIGS. 5-21 are views of a user interface of a location-aware data service client.

FIG. 5 is a list screen view of user interface 115. In the list screen view, a user may view results of a recent search, extend the results (acquire more records) by scrolling to the end of a list, sort search results differently, alter filters used to construct (that is, constrain) the search, and/or view an individual company's profile by tapping its name.

Figure 6:
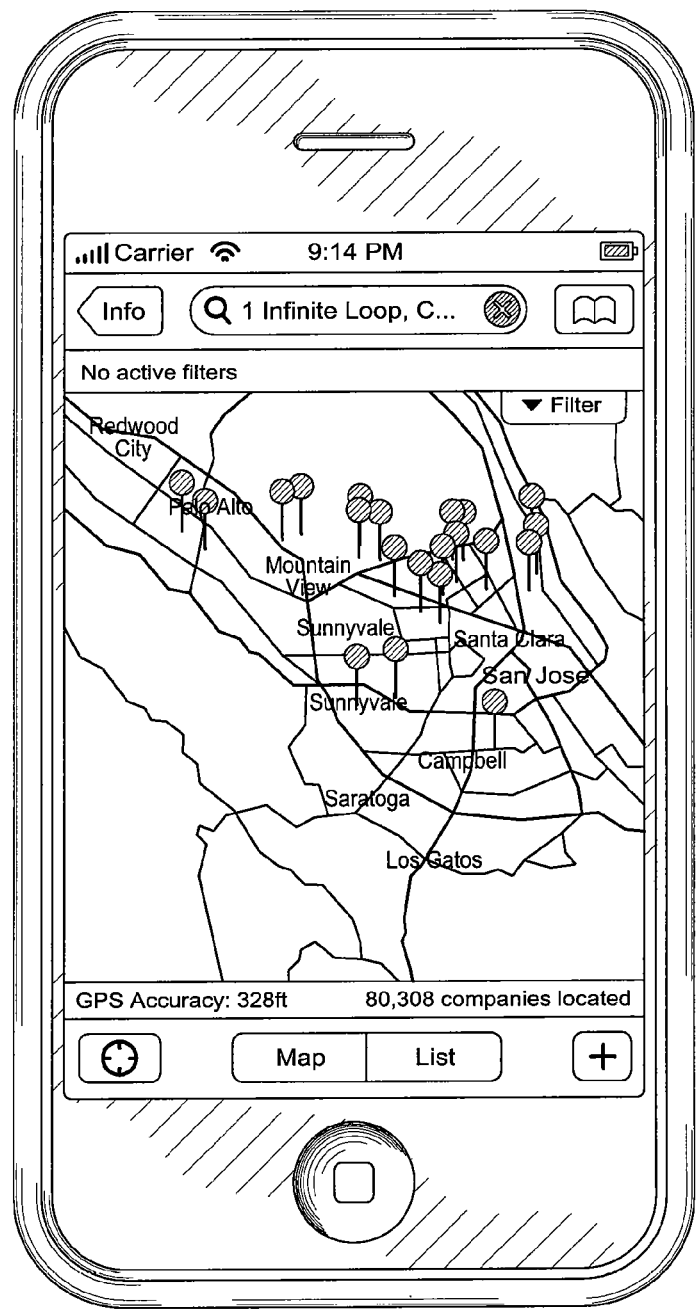

FIG. 6 is a map screen view of user interface 115. In the map screen view, a user may view results of the most recent search, change the geographic area or bounding box in which to search (by either manipulating the map or pressing a "go to my current location" button (not shown) in the lower-left corner), alter the filters used to constrain the search, add a bookmark to store this map location into memory or storage device, and/or retrieve previously-saved bookmarks (both location bookmarks as well as company profile bookmarks).

Figure 7:
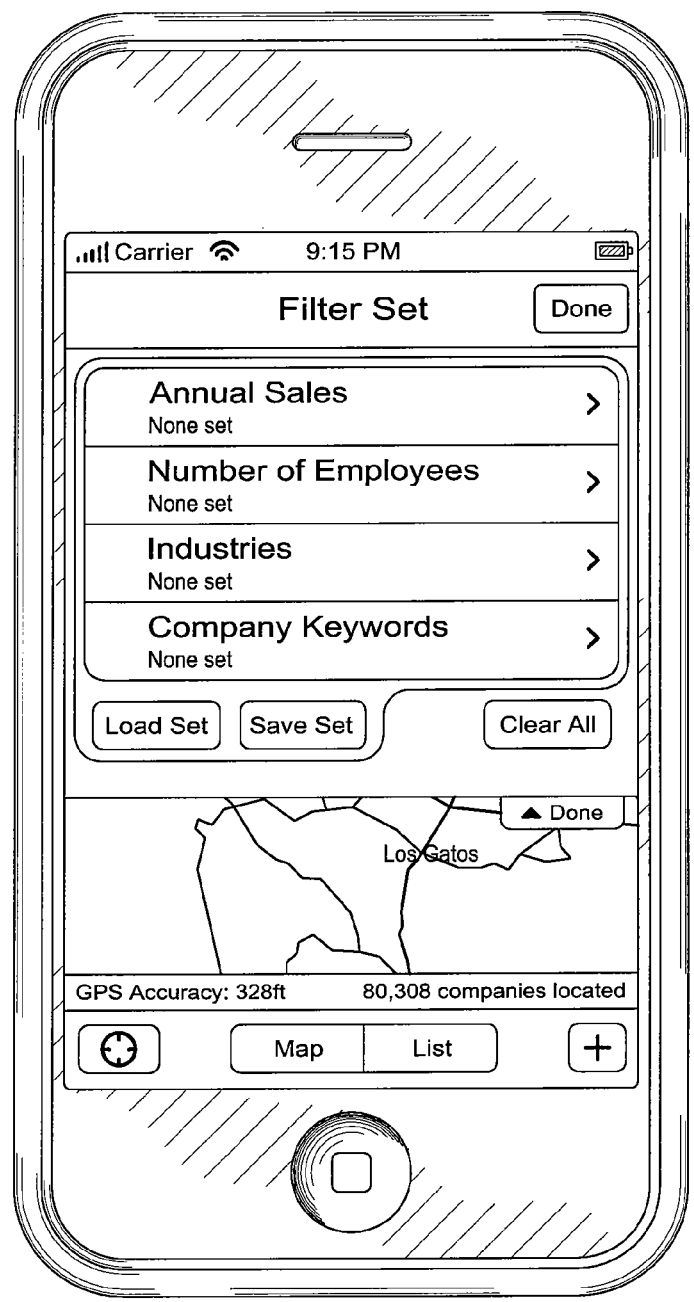

FIG. 7 is an open filter drawer view of user interface 115. In the open filter drawer view, a user may view a summary of currently-active filters, change any filter by tapping its name, save the entire set of active filters for later retrieval, retrieve and establish a previously-saved set of active filters, or clear all filters.

Figure 8:
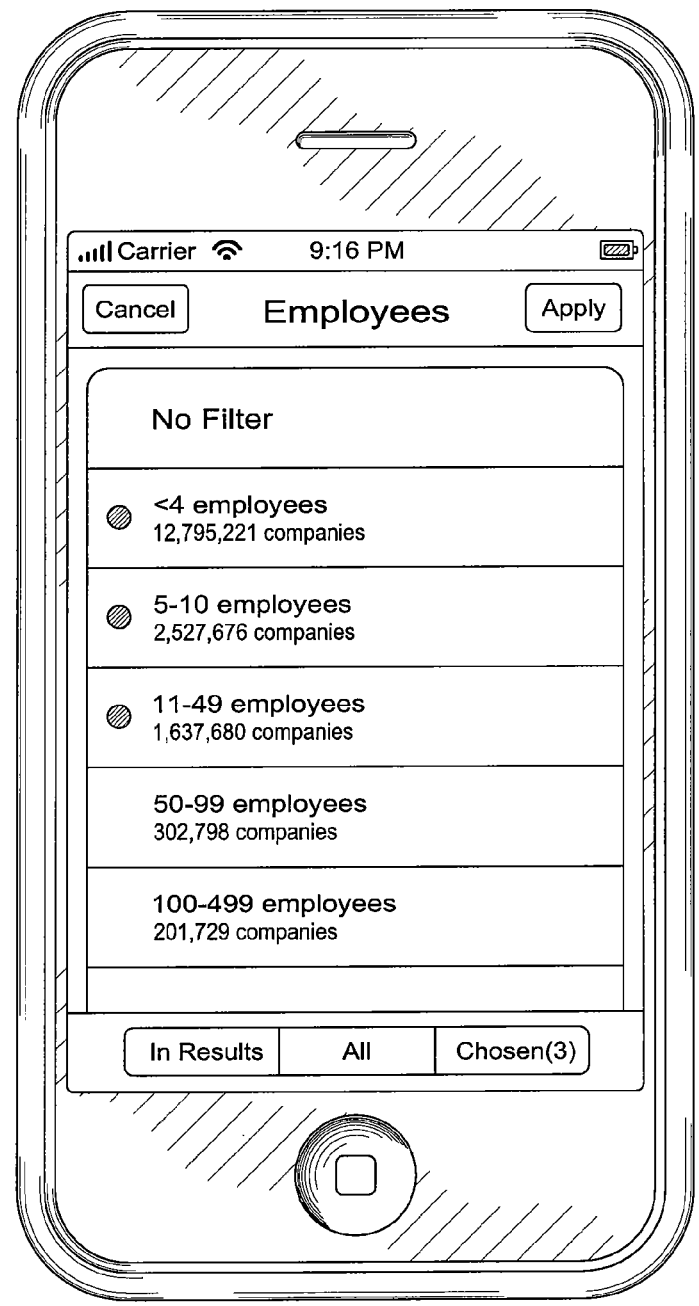

FIG. 8 is an employees nav view of user interface 115. In the employees nav view, a user effects filtering of companies by number of employees. The user may set any number of available ranges, with the expectation of retrieving company records that match any selected range (the selections are ORed together). The user may view only those ranges applicable to the user's current search results (taking both geographic constraints as well as constraints imposed by other filters), ranges applicable across the entire search corpus, or only those ranges that have been previously selected.

Figure 9:
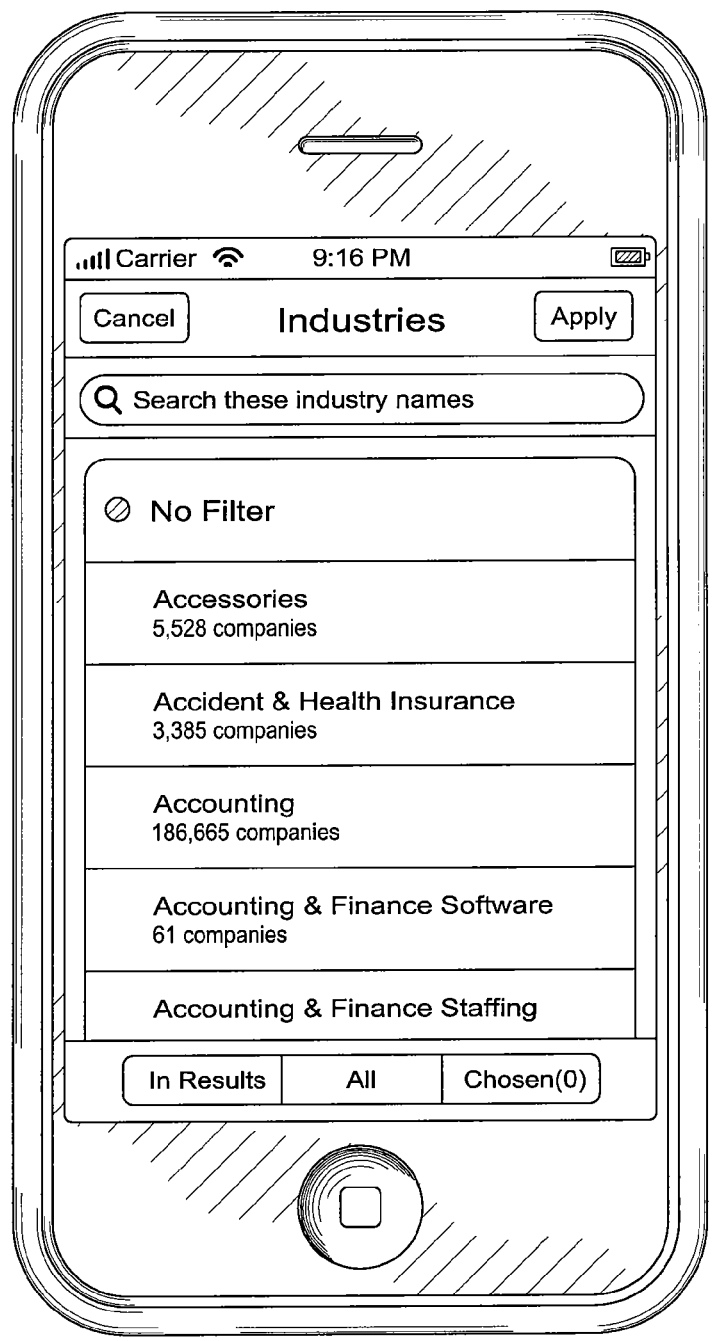

FIG. 9 is an industries nav view of user interface 115. In the industries nav view, a user effects filtering of companies by industry. The user may set any number of available industries, with the expectation of retrieving company records that match any selected industry (the selections are ORed together). The user may view only those industries applicable to their current search results (taking both geographic constraints as well as constraints imposed by other filters), industries applicable across the entire search corpus, or only those industries that have been previously selected. A search area is available to allow the user to locate specific industries in the shown list by name, as by typing, speaking, or otherwise so indicating.

Figure 10:
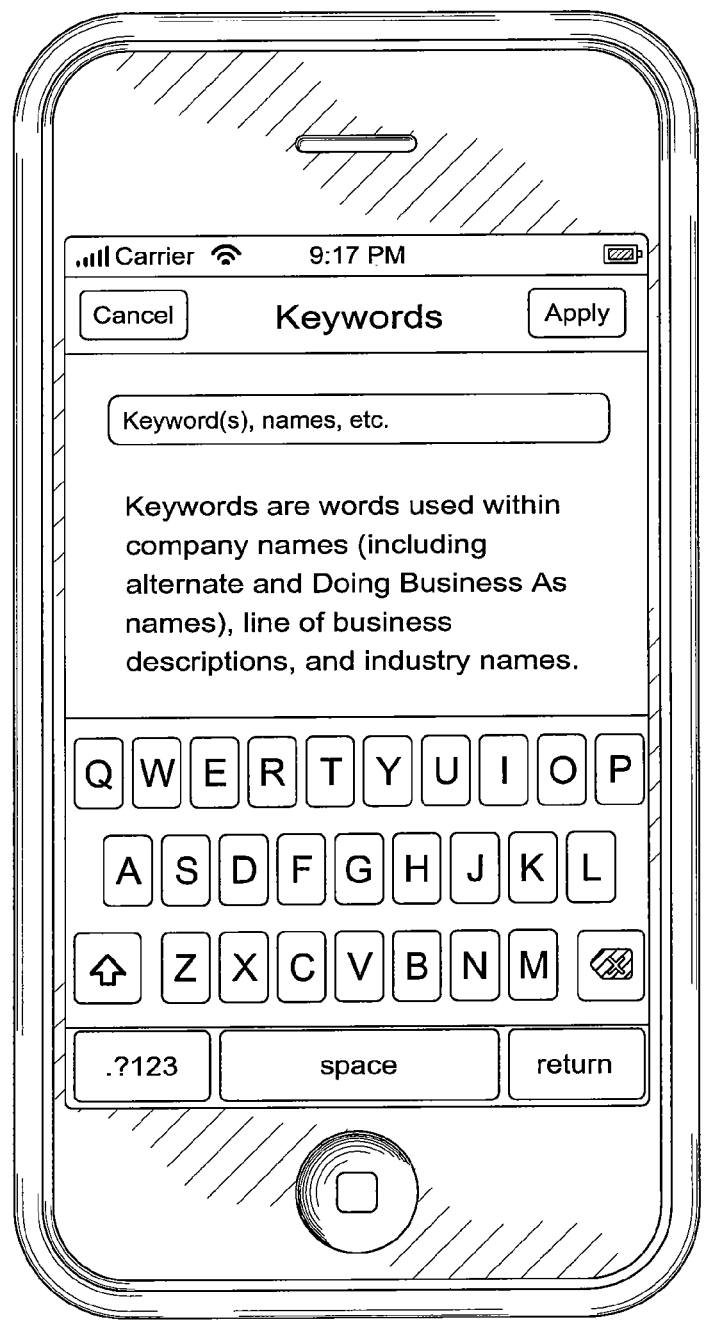

FIG. 10 is a keyword nav view of user interface 115. In the keyword nav view, a user effects filtering of companies by keyword. Individual keywords entered here are matched against a large number of data points within company records in the search corpus. Data points include company name, doing-business-as names, textual descriptions, etc. The individual words are ORed together, meaning that any final matching record will match at least one of the entered keywords.

Figure 11:
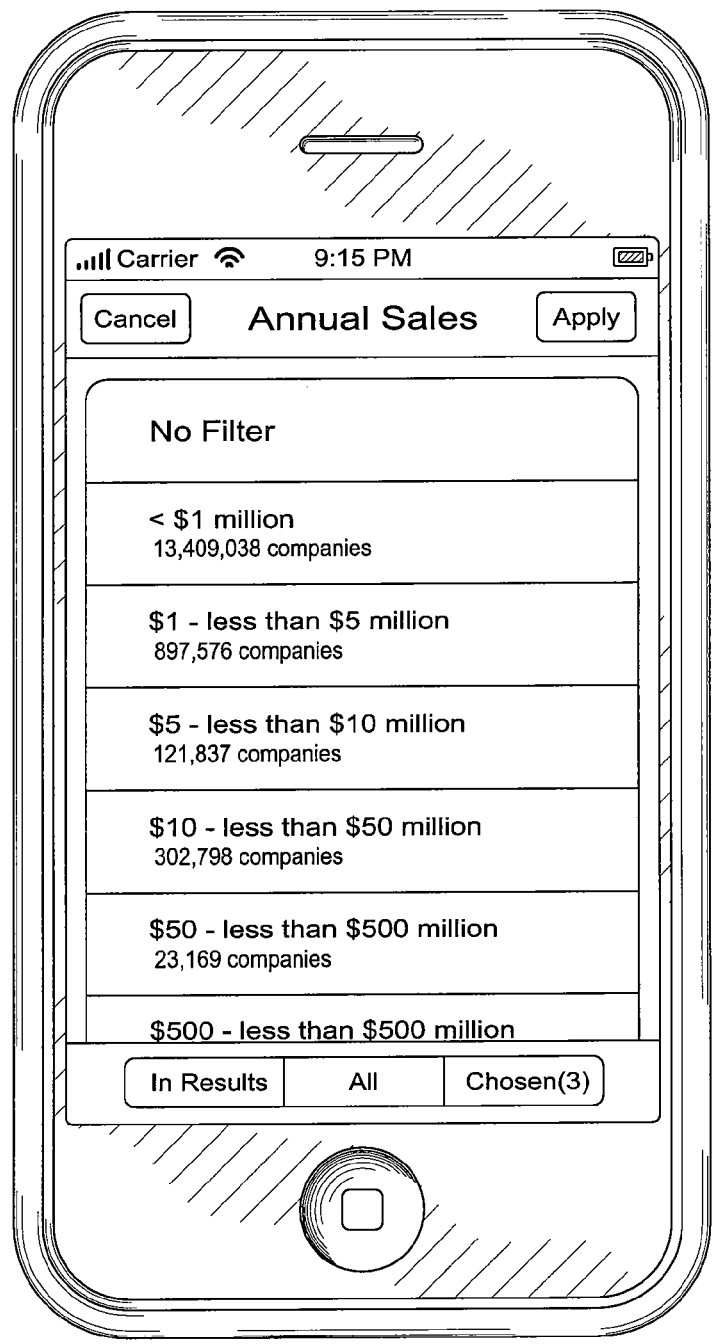

FIG. 11 is a sales nav view of user interface 115. In the sales nav view, a user effects filtering of companies by annual sales. The user may set any number of available ranges, with the expectation retrieving company records that match any selected range (the selections are ORed together). The user may view only those ranges applicable to their current search results (taking both geographic constraints as well as constraints imposed by other filters), ranges applicable across the entire search corpus, or only those ranges that have been previously selected.

Figure 12:
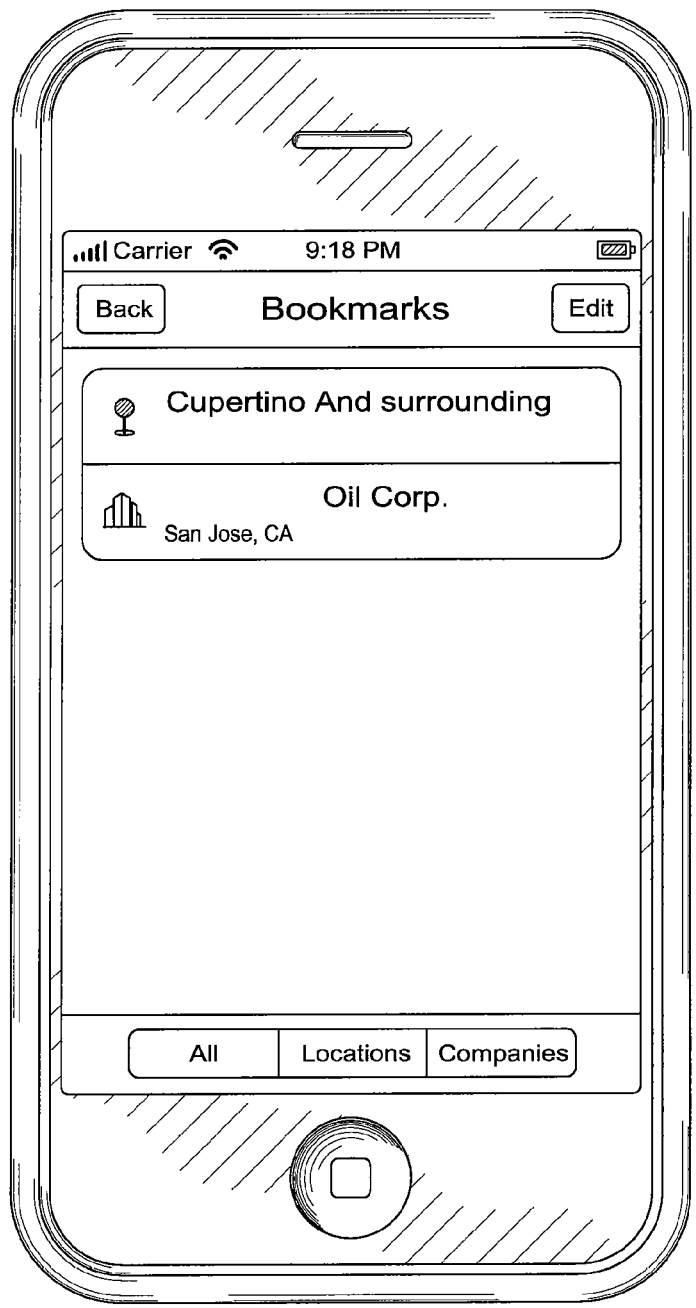

FIG. 12 is a bookmarks view of user interface 115. In the bookmarks view, a user may select a previously-saved location (resulting in the saved location being displayed on a map view) or a previously-saved company profile (resulting in both an updated profile being displayed as well as the map changing to show that company's location) by tapping its name. The user may choose to view location and company bookmarks together or separately. User interface 115 has controls for deleting or manually reordering bookmarks.

Figure 13:
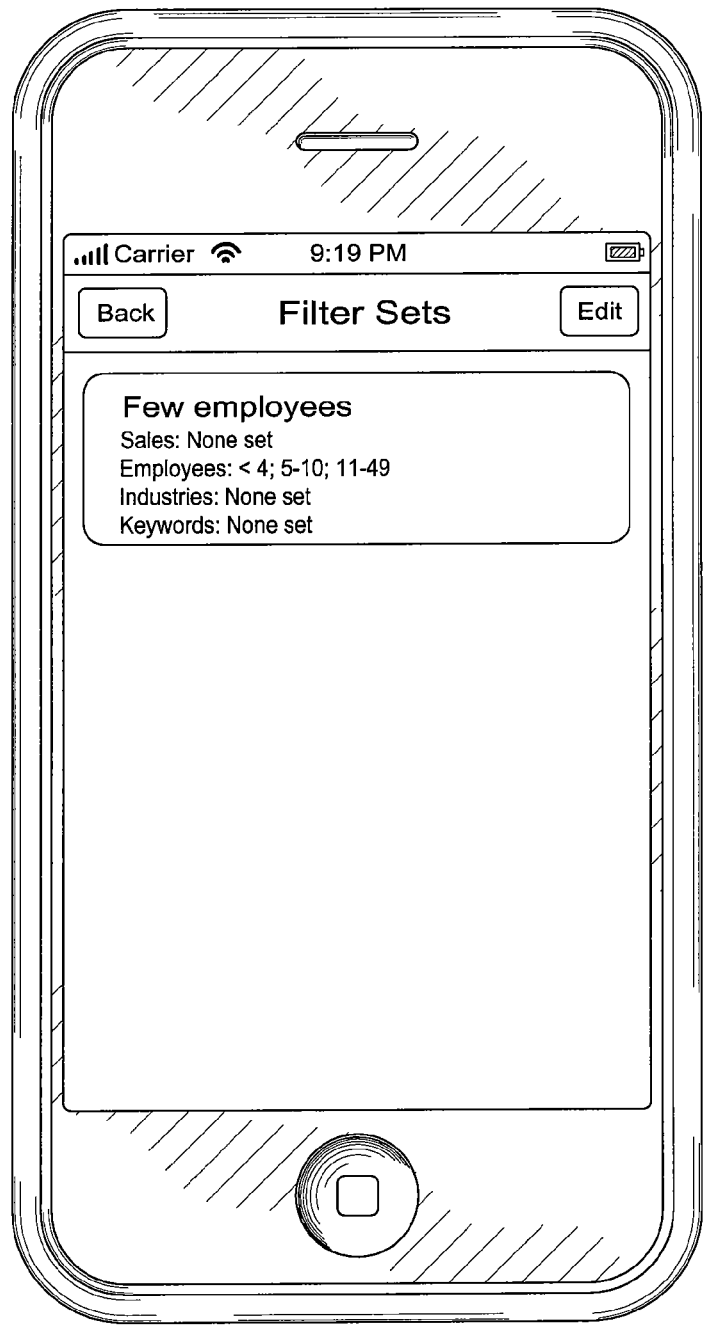

FIG. 13 is a filter sets view of user interface 115. In the filter sets view, a user manages stored filter sets. The user may select a previously-saved filter set by tapping its name, resulting in replacing any current filter settings with those just selected. User interface 115 has controls for deleting or manually reordering filter sets.

Figure 14:

FIG. 14 is a place call view of user interface 115. In the place call view, a user causes client 100 to initiate a communication, such as a voice communication.

Figure 15:

FIG. 15 is a primary profile view of user interface 115. In the primary profile view, a user may view data points of interest related to a company, including names in use and contact information. User interface 115 has controls to view the company's location on a map, communicate with the company, and view the company's web site, all from within user interface 115. As indicated in FIG. 15, user interface 115 also includes a button that the user can select to initiate a search for local competitors. The search for local competitors is described above, with reference to FIG. 3.

Figure 16:
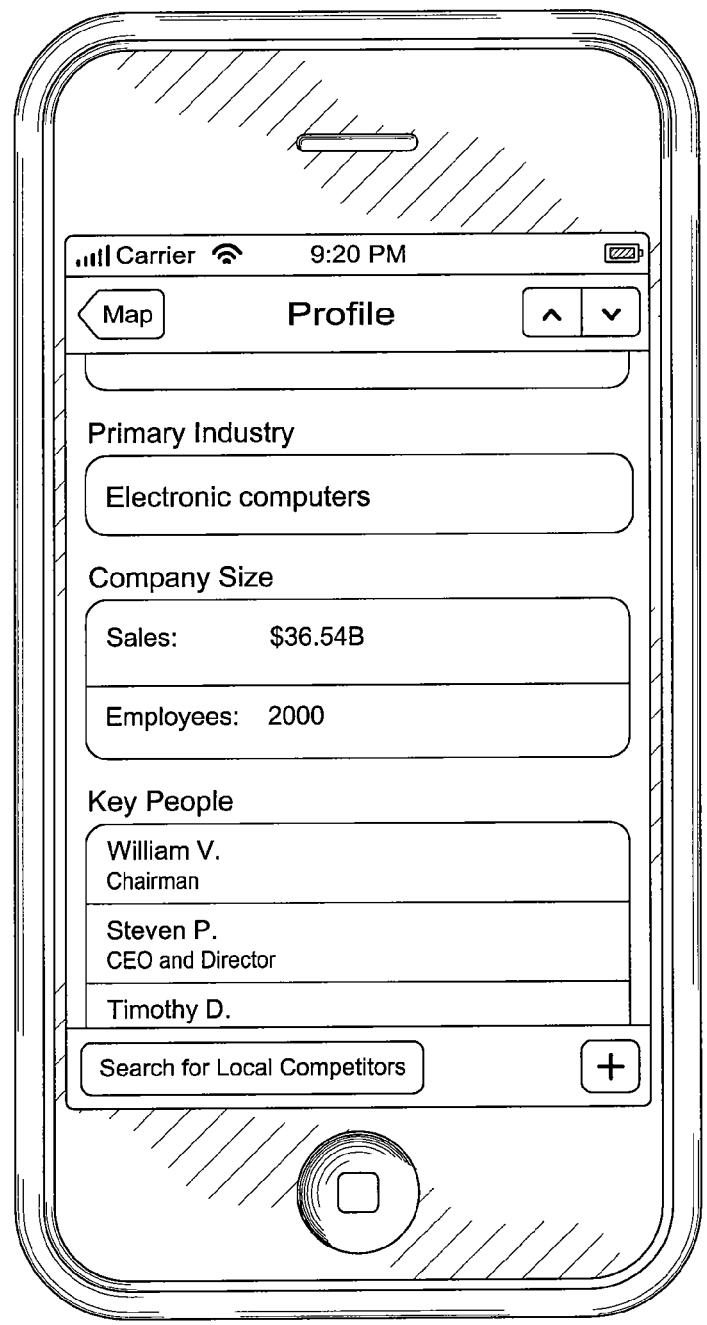

FIG. 16 is a secondary profile view of user interface 115. In the secondary profile view, a user may view more interesting data points related to a company, including the company's primary industry, the size of the company, and the names and titles of people associated with the company.

Figure 17:
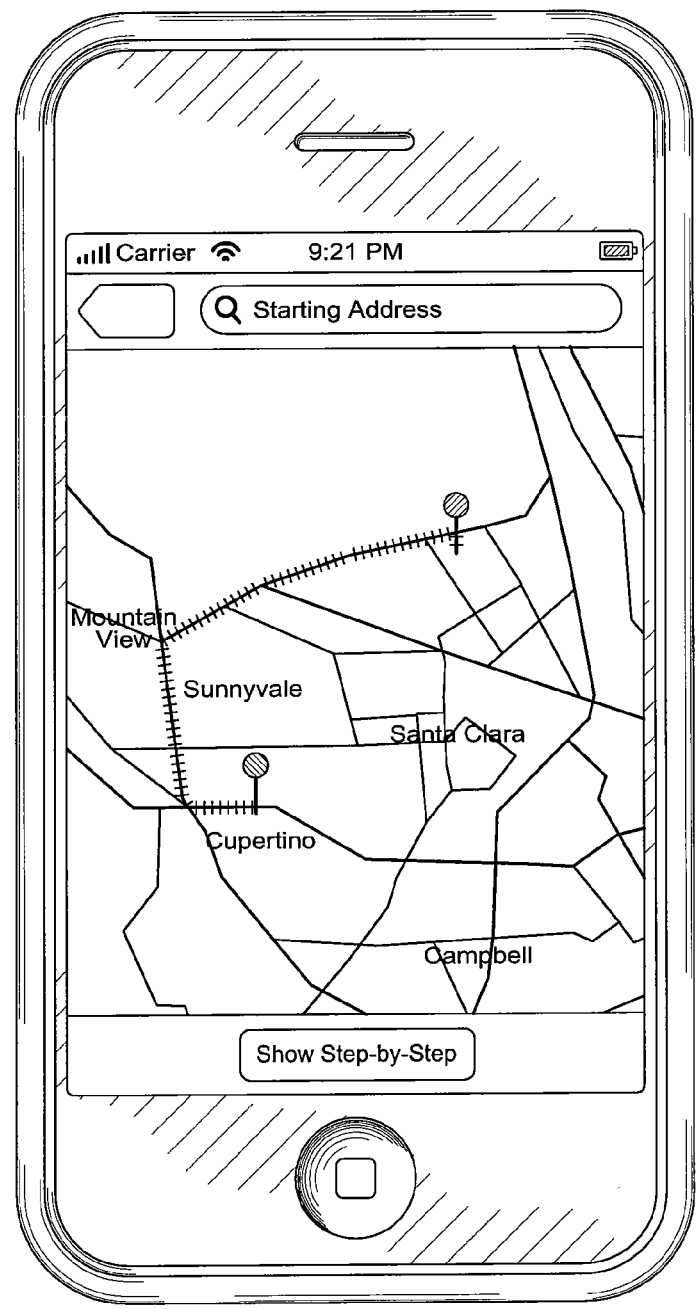

FIG. 17 is a driving directions view of user interface 115. In the driving directions view, a user is presented with driving directions from an origin to a destination. The origin is, for example, the user's physical location, and the destination is an address of a company.

Figure 18:
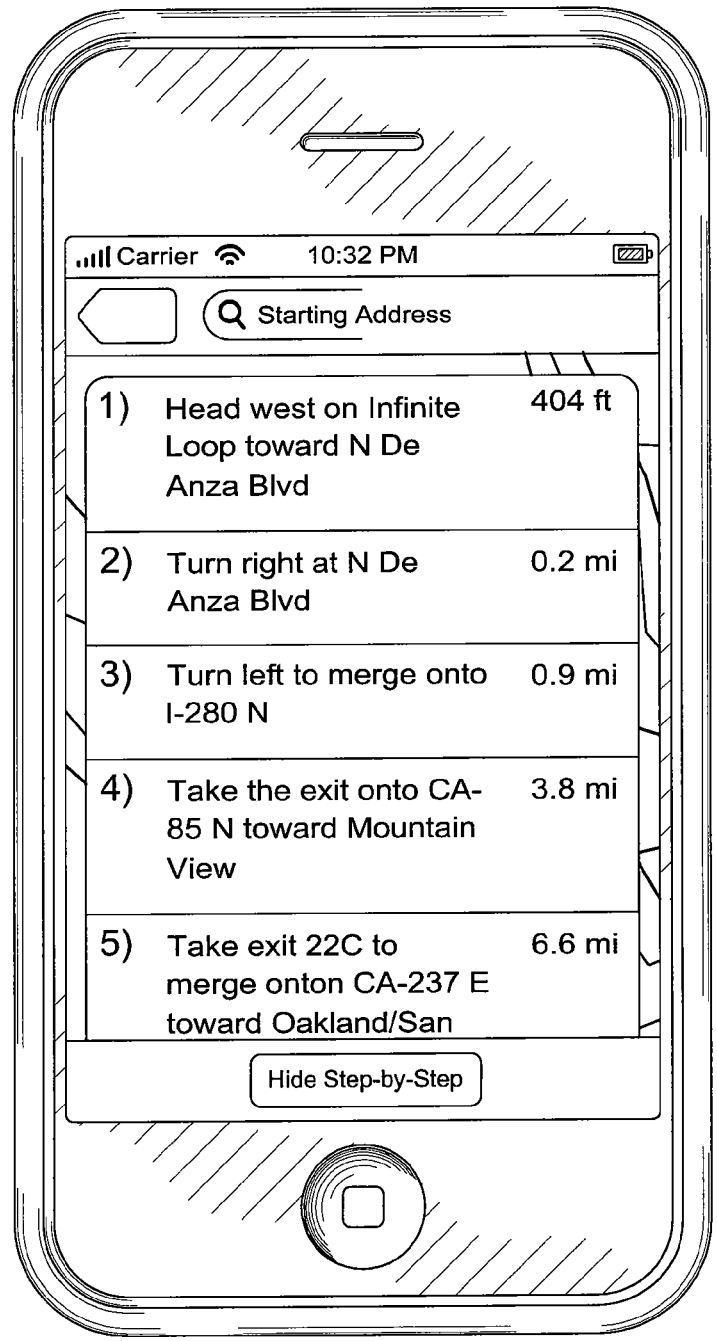

FIG. 18 is a driving directions text view of user interface 115. In the driving directions text view, a user is presented with driving directions from an origin to a destination. The origin is, for example, the user's physical location, and the destination is an address of a company.

Figure 19:
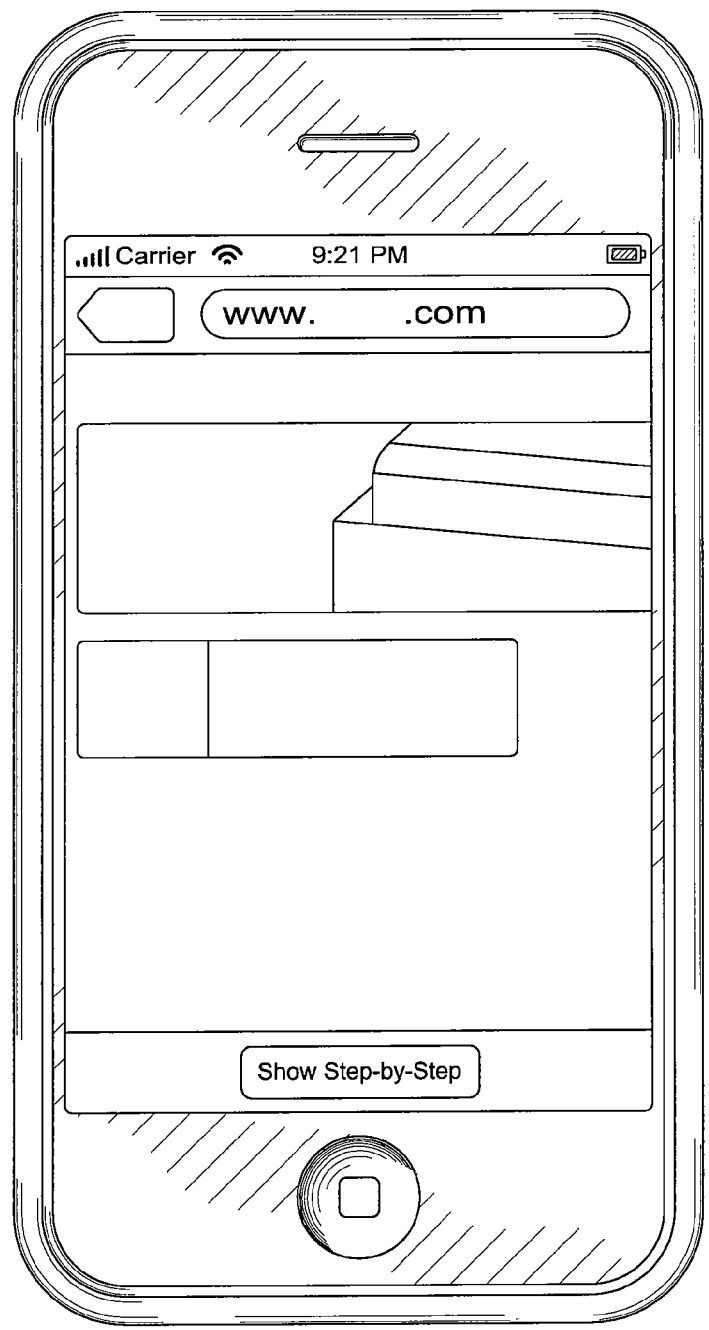

FIG. 19 is a website view of user interface 115. In the website view, a user browses a website for a company of interest.

Figure 20:
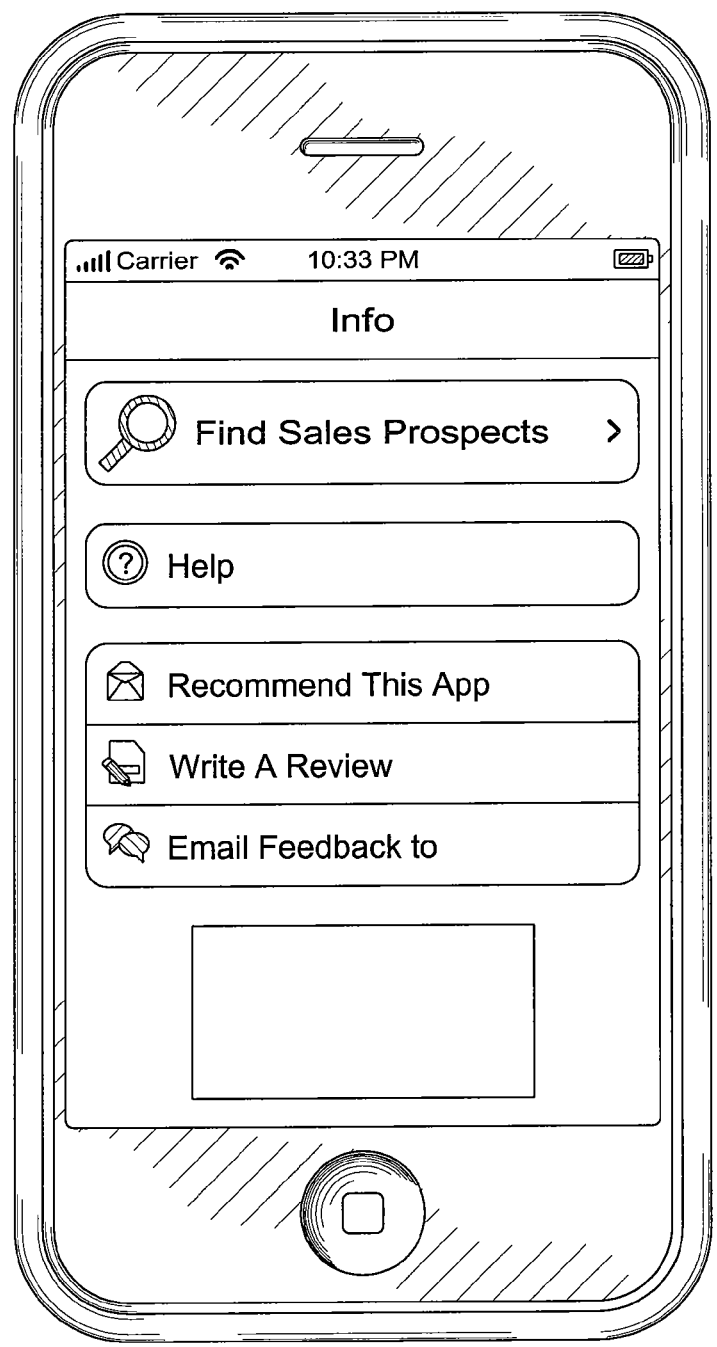

FIG. 20 is an info view of user interface 115. In the info view, a user may acquire assistance with user interface functionality, recommend the user interface to a friend via an email message, send feedback or a question via an email interface, or be given the opportunity to provide rating-style feedback on the user interface in a public forum. A control is provided to return the user to the primary map or list view.

Figure 21:
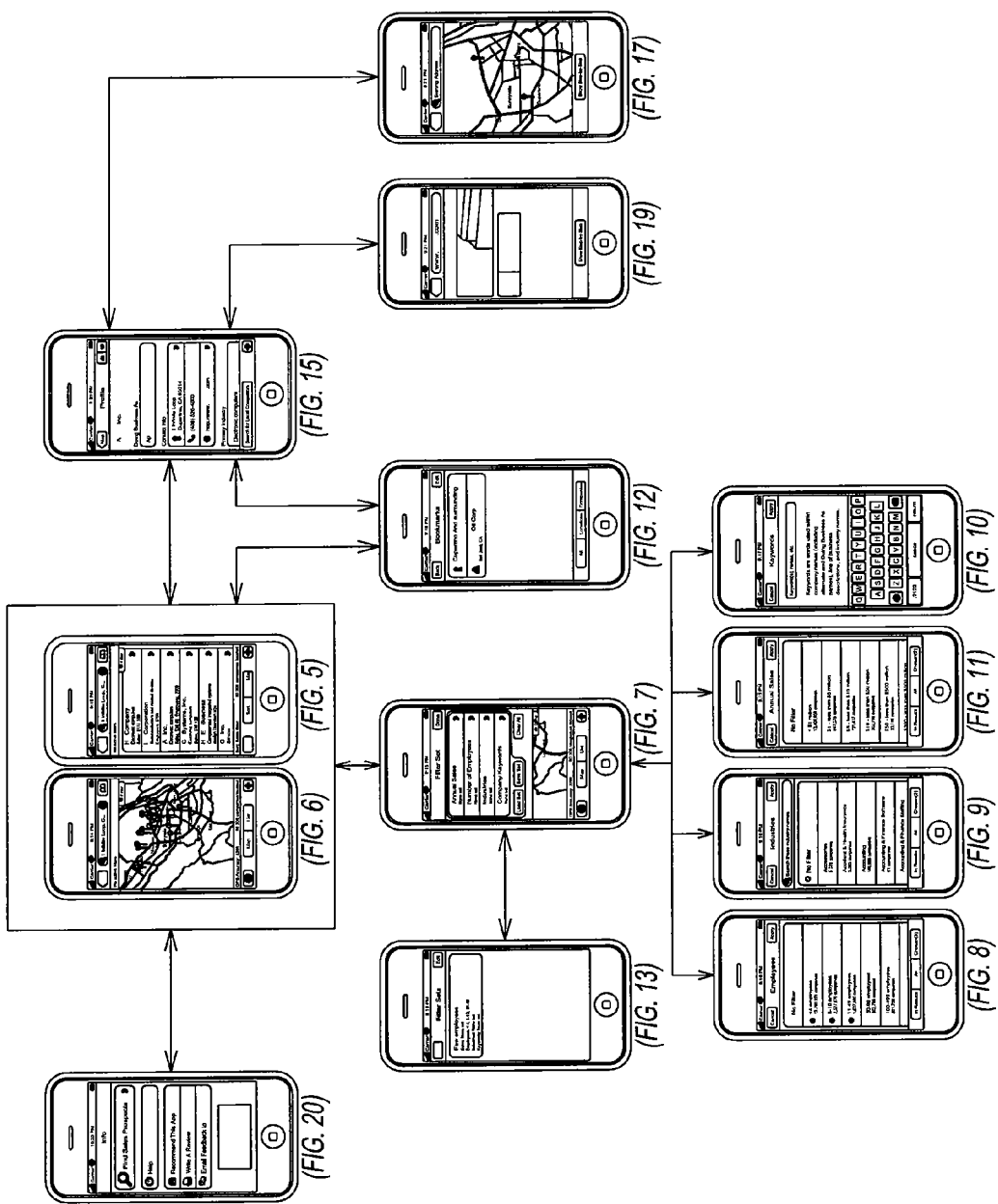

FIG. 21 is a flow view of navigating between the foregoing views of user interface 115. The flow view shows the connection between the various screens within the app, each displayed in response to specific user actions.

What is claimed is:

1. A method comprising:

sending to a geocoding service, a search string that includes an indicator of a location and other information, wherein said geocoding service returns (i) a bounding box that defines a geographic area, and (ii) a set of terms, from said search string, that said geocoding service utilized to produce said bounding box;

comparing said set of terms to said search string, thus yielding a comparison;

identifying from said comparison, a term from said search string that is not in said set of terms, thus yielding a leftover word;

constructing an augmentation query that includes said leftover word and said bounding box; and sending said augmentation query to a business search engine that searches a database and returns results that include coordinates of a set of business entities located within said geographic area.

2. The method of claim 1, wherein said bounding box is a first bounding box and said geographic area is a first geographic area, and wherein said method further comprises:

computing a second bounding box that defines a second geographic area that is within said first geographic area and that encompasses said coordinates of said set of business entities.

3. The method of claim 2,
wherein said set of business entities is a first set of business entities and said augmentation query is a first query, and
wherein said method further comprises:
sending to said business search engine, a second query that includes said second bounding box and an additional parameter, wherein said business search engine returns coordinates of a second set of business entities located within said second geographic area.

4. The method of claim 3, further comprising:
displaying a map that indicates locations of said second set of business entities, based on said coordinates of said second set of business entities.

5. The method of claim 1,
wherein said business search engine returns said results in descending order of relevance, and
wherein said relevance is a metric selected from the group consisting of (a) rarity of said leftover word in said database, (b) frequency of said leftover word in individual records of said results, and (c) density of said leftover word as compared to a result record size.

6. An apparatus comprising:
a processor; and
a memory that contains instructions that are readable by said processor and cause said processor to:
send to a geocoding service, a search string that includes an indicator of a location and other information, wherein said geocoding service returns (i) a bounding box that defines a geographic area, and (ii) a set of terms, from said search string, that said geocoding service utilized to produce said bounding box;
compare said set of terms to said search string, thus yielding a comparison;
identify from said comparison, a term from said search string that is not in said set of terms, thus yielding a leftover word;
construct an augmentation query that includes said leftover word and said bounding box; and
send said augmentation query to a business search engine that searches a database and returns results that include coordinates of a set of business entities located within said geographic area.

7. The apparatus of claim 6,
wherein said bounding box is a first bounding box and said geographic area is a first geographic area, and
wherein said instructions also cause said processor to:
compute a second bounding box that defines a second geographic area that is within said first geographic area and that encompasses said coordinates of said set of business entities.

8. The apparatus of claim 7,
wherein said set of business entities is a first set of business entities and said augmentation query is a first query, and
wherein said instructions also cause said processor to:
send to said business search engine, a second query that includes said second bounding box and an additional parameter, wherein said business search engine returns coordinates of a second set of business entities located within said second geographic area.

9. The apparatus of claim 8, wherein said instructions also cause said processor to:
display a map that indicates locations of said second set of business entities, based on said coordinates of said second set of business entities.

10. The apparatus of claim 6,
wherein said business search engine returns said results in descending order of relevance, and
wherein said relevance is a metric selected from the group consisting of (a) rarity of said leftover word in said database, (b) frequency of said leftover word in individual records of said results, and (c) density of said leftover word as compared to a result record size.

11. A non-transitory storage medium comprising instructions that are readable by a processor and cause said processor to:
send to a geocoding service, a search string that includes an indicator of a location and other information, wherein said geocoding service returns (i) a bounding box that defines a geographic area, and (ii) a set of terms, from said search string, that said geocoding service utilized to produce said bounding box;
compare said set of terms to said search string, thus yielding a comparison;
identify from said comparison, a term from said search string that is not in said set of terms, thus yielding a leftover word;
construct an augmentation query that includes said leftover word and said bounding box; and
send said augmentation query to a business search engine that searches a database and returns results that include coordinates of a set of business entities located within said geographic area.

12. The non-transitory storage media of claim 11,
wherein said bounding box is a first bounding box and said geographic area is a first geographic area, and
wherein said instructions also cause said processor to:
compute a second bounding box that defines a second geographic area that is within said first geographic area and that encompasses said coordinates of said set of business entities.

13. The non-transitory storage media of claim 12,
wherein said set of business entities is a first set of business entities and said augmentation query is a first query, and
wherein said instructions also cause said processor to:
send to said business search engine, a second query that includes said second bounding box and an additional parameter, wherein said business search engine returns coordinates of a second set of business entities located within said second geographic area.

14. The non-transitory storage media of claim 13, wherein said instructions also cause said processor to:
display a map that indicates locations of said second set of business entities, based on said coordinates of said second set of business entities.

15. The non-transitory storage media of claim 11,
wherein said business search engine returns said results in descending order of relevance, and
wherein said relevance is a metric selected from the group consisting of (a) rarity of said leftover word in said database, (b) frequency of said leftover word in individual records of said results, and (c) density of said leftover word as compared to a result record size.

16. A method comprising:
sending to a geocoding service, a search string that includes an indicator of a location and other information, wherein said geocoding service returns (i) a bounding box that defines a geographic area, and (ii) a set of terms, from said search string, that said geocoding service utilized to produce said bounding box;
comparing said set of terms to said search string, thus yielding a comparison;
identifying from said comparison, a term from said search string that is not in said set of terms, thus yielding a leftover word;

constructing an augmentation query that includes said leftover word and said bounding box;

sending said augmentation query to a business search engine that searches a database and returns results that include an identifier of a first business entity located within said geographic area and an indicator of an industry in which said first business entity is engaged; and sending to said business search engine, a query that includes said bounding box and said indicator of said industry in which said first business entity is engaged, wherein said business search engine returns coordinates of a second business entity located within said geographic area.

17. The method of claim 16, wherein said business search engine returns said results in descending order of relevance, and wherein said relevance is a metric selected from the group consisting of (a) rarity of said leftover word in said database, (b) frequency of said leftover word in individual records of said results, and (c) density of said leftover word as compared to a result record size.

18. An apparatus comprising:

a processor; and a memory that contains instructions that are readable by said processor and cause said processor to:

send to a geocoding service, a search string that includes an indicator of a location and other information, wherein said geocoding service returns (i) a bounding box that defines a geographic area, and (ii) a set of terms, from said search string, that said geocoding service utilized to produce said bounding box;

compare said set of terms to said search string, thus yielding a comparison;

identify from said comparison, a term from said search string that is not in said set of terms, thus yielding a leftover word;

construct an augmentation query that includes said leftover word and said bounding box;

send said augmentation query to a business search engine that searches a database and returns results that include an identifier of a first business entity located within said geographic area and an indicator of an industry in which said first business entity is engaged; and send to said business search engine, a query that includes said bounding box and said indicator of said industry in which said first business entity is engaged, wherein said business search engine returns coordinates of a second business entity located within said geographic area.

19. The apparatus of claim 18, wherein said business search engine returns said results in descending order of relevance, and wherein said relevance is a metric selected from the group consisting of (a) rarity of said leftover word in said database, (b) frequency of said leftover word in individual records of said results, and (c) density of said leftover word as compared to a result record size.

20. A non-transitory storage medium comprising instructions that are readable by a processor and cause said processor to:

send to a geocoding service, a search string that includes an indicator of a location and other information, wherein said geocoding service returns (i) a bounding box that defines a geographic area, and (ii) a set of terms, from said search string, that said geocoding service utilized to produce said bounding box;

comparing said set of terms to said search string, thus yielding a comparison;

identify from said comparison, a term from said search string that is not in said set of terms, thus yielding a leftover word;

construct an augmentation query that includes said leftover word and said bounding box;

send said augmentation query to a business search engine that searches a database and returns an identifier of a first business entity located within said geographic area and an indicator of an industry in which said first business entity is engaged; and send to said business search engine, a query that includes said bounding box and said indicator of said industry in which said first business entity is engaged, wherein said business search engine returns coordinates of a second business entity located within said geographic area.

21. The non-transitory storage medium of claim 20, wherein said business search engine returns said results in descending order of relevance, and wherein said relevance is a metric selected from the group consisting of (a) rarity of said leftover word in said database, (b) frequency of said leftover word in individual records of said results, and (c) density of said leftover word as compared to a result record size.

\* \* \* \* \*